US009842715B2

(12) United States Patent
Devine et al.

(10) Patent No.: US 9,842,715 B2
(45) Date of Patent: Dec. 12, 2017

(54) ELECTRICAL SWITCHING APPARATUS AND STRAIN RELIEF ASSEMBLY THEREFOR

(71) Applicant: EATON CORPORATION, Cleveland, OH (US)

(72) Inventors: Jack Edward Devine, Pittsburgh, PA (US); David Curtis Turner, Imperial, PA (US); Stephanie Feejin Lee, Ashland, MA (US); Bradley Patrick Rizzo, Bethel Park, PA (US); Mark Anthony Janusek, Bethel Park, PA (US); Richard Paul Malingowski, McDonald, PA (US); James Patrick Sisley, Baden, PA (US)

(73) Assignee: EATON CORPORATION, Cleveland, OH (US)

( * ) Notice: Subject to any disclaimer, the term of this patent is extended or adjusted under 35 U.S.C. 154(b) by 89 days.

(21) Appl. No.: 14/959,161

(22) Filed: Dec. 4, 2015

(65) Prior Publication Data

US 2017/0162356 A1 Jun. 8, 2017

(51) Int. Cl.
*H01H 71/02* (2006.01)
(52) U.S. Cl.
CPC ................................ *H01H 71/025* (2013.01)
(58) Field of Classification Search
CPC .................................................. H01H 71/025
USPC .......... 200/293; 439/96, 369, 449, 783, 942, 439/455, 460, 465–467; 174/51
See application file for complete search history.

(56) References Cited

U.S. PATENT DOCUMENTS

| 4,125,238 A | 11/1978 | Tanaka |
| 4,963,104 A * | 10/1990 | Dickie ................. H01R 9/0524 439/460 |
| 5,118,306 A * | 6/1992 | Bixler ................. H01R 12/675 439/358 |
| 5,493,265 A | 2/1996 | Whipple et al. |

FOREIGN PATENT DOCUMENTS

| AU | 715 916 B2 | 2/2000 |
| JP | 2006 140100 A | 6/2006 |

OTHER PUBLICATIONS

European Patent Office, "International Search Report and Written Opinion", PCT/US2016/062145, dated Feb. 3, 2017, 12 pp.

* cited by examiner

*Primary Examiner* — Edwin A. Leon
(74) *Attorney, Agent, or Firm* — Eckert Seamans; Seth Newman; Grant Coffield

(57) ABSTRACT

Electrical switching apparatus and strain relief assemblies therefor are described herein. In one exemplary, non-limiting embodiment, a strain relief assembly includes a cover and a base, each of which include a number of grooves structured to receive a number of wires. Each groove has a first side and a second side, where the second side is located opposite the first side. Furthermore, located on the first side and/or the second side are a number of protrusions. The grooves and the protrusions serve to secure the number of wires within the strain relief assembly such that, if a force is applied to an end of the wire, the protrusions work to retain the wires with the assembly.

19 Claims, 5 Drawing Sheets

ELECTRICAL SWITCHING APPARATUS AND STRAIN RELIEF ASSEMBLY THEREFOR

BACKGROUND

Field

The disclosed concept relates generally to electrical switching apparatus and, more particularly, to electrical switching apparatus such as a circuit breakers. The disclosed concept also relates to strain relief assemblies for circuit breakers.

Background Information

Electrical switching apparatus, such as circuit breakers, as well as transfer switches, network protectors and the like, are often equipped with components or accessories such as, for example and without limitation, trip actuator assemblies, auxiliary switches, shunt trip devices, under voltage release devices, and bell alarms. Such devices can be employed in a variety of ways to provide signals indicating certain conditions within the apparatus and/or to initiate a change in status of the apparatus such as, for example, to trip open the separable contacts of the apparatus in response to an electrical fault condition (e.g., without limitation, current overload; short circuit; abnormal voltage).

Some accessories include a number of electrical conductors (e.g., wires) that exit the circuit breaker. Various techniques have been used to secure wires exiting circuit breakers. These techniques typically involve the use of an additional part or component, such as a securing component (e.g., zip-tie, wires, string, etc.). These parts may, however, cause difficulty in maintaining a consistent level of security for the wires, as each time the wires are tested or adjusted, the securing component will need to be removed and reattached. Also, the uniformity of each setup will vary as these securing mechanisms do not all apply an equal amount of force. Furthermore, the additional components need to be capable of withstanding the heat and energy levels associated with circuit breakers, which limits the number of options for, as well as the lifetime of, these securing components. Further still, the fewer the number of components needed to secure the wires, the more uniform and structurally sound the wires will be when used. This is because the number of components that can fail, or that can differ from setup to setup, is minimized.

There is room for improvement in electrical switching apparatus, such as circuit breakers, and in strain relief assemblies therefor.

SUMMARY

These needs and others are met by embodiments of the disclosed concept, which are directed to strain relief assemblies for securing conductors (e.g., without limitation, wires) exiting an electrical switching apparatus, such as a circuit breaker.

As one aspect of the disclosed concept, a strain relief assembly is provided for an accessory of an electrical switching apparatus. The strain relief assembly includes a cover and a base. The cover includes a number of first grooves that are structured to receive a number of wires. Each first groove of the number of first grooves has a first side and a second side, where the second side is located opposite the first side. The cover also includes a number of first protrusions located on the first side and/or the second side of the first groove. The base includes a number of second grooves that are structured to receive a respective wire of the number of wires from the number of first grooves. Each second groove of the number of second grooves has a third side and a fourth side, where the fourth side is located opposite the first side. The base also includes a number of second protrusions located on the third side and/or the fourth side.

As another aspect of the disclosed concept, a strain relief system for an electrical switching apparatus is provided. The strain relief assembly includes a primary cover, a second cover, and a wire. The primary cover includes a side wall and an extension portion that form a trough. The extension portion has a first a protrusion located at an end of the extension portion. The secondary cover is placed over the primary cover, and includes at least a second protrusion and a third protrusion. The wire is coupled to an accessory component located within a pocket of the primary cover. The strain relief system is structured such that the wire extends through a channel formed between the first protrusion of the primary cover, and the second protrusion and third protrusion of the secondary cover. The strain relief system is further structured such that the wire exits the electrical switching apparatus from the trough, which is connected to the channel.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
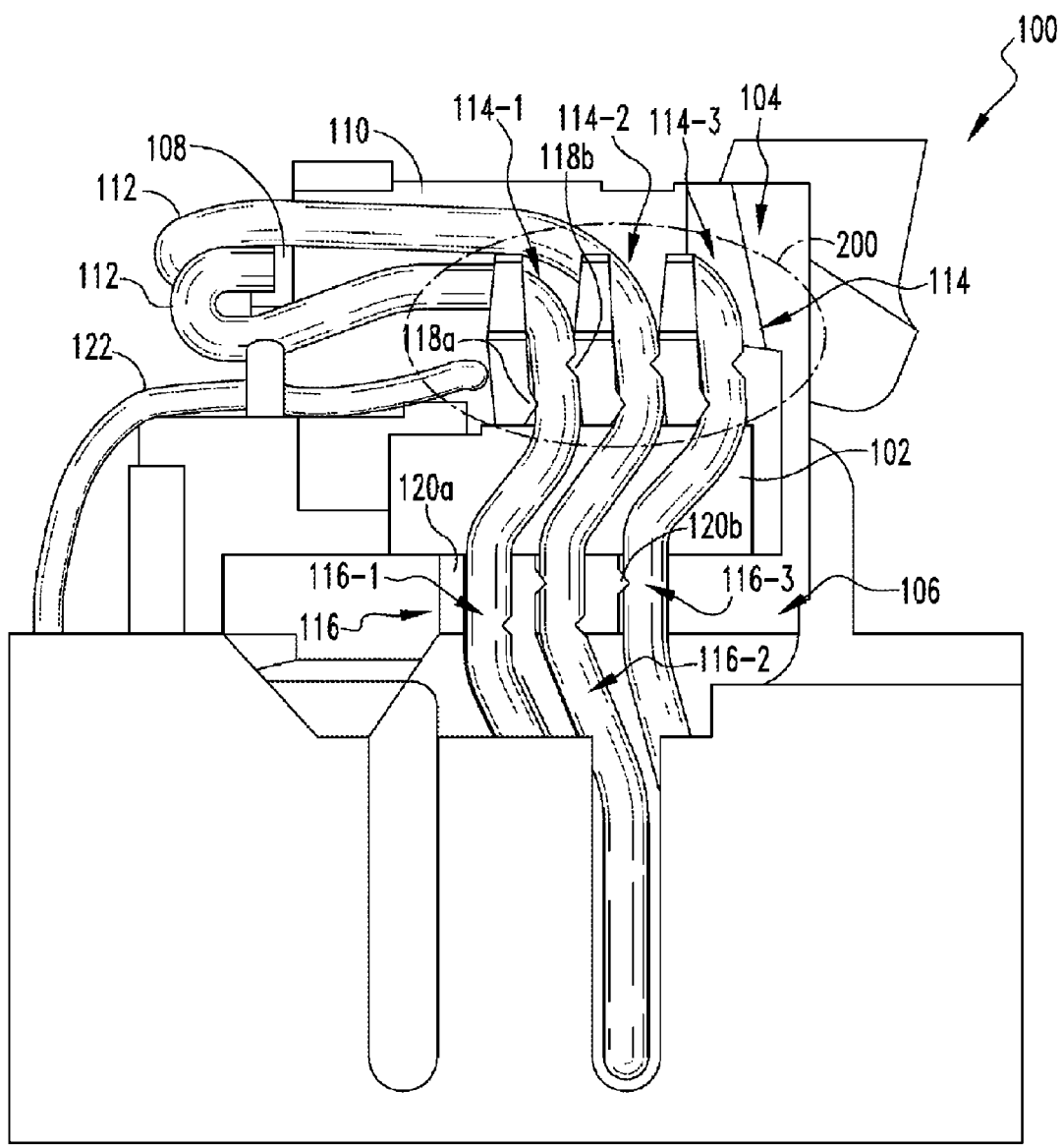
FIG. 1 is an illustrative schematic diagram of a side view of a portion of a circuit breaker and strain relief assembly therefor in accordance with an embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "accessory" refers to any known or suitable component or feature of an electrical switching apparatus having a number of electrical conductors (e.g., without limitation, wires) and expressly includes, but is not limited to, trip actuators, auxiliary switches, shunt trip devices, under voltage release devices, bell alarms.

As employed herein, the term "fastener" shall mean a separate element or elements which is/are employed to connect or tighten two or more components together, and expressly includes, without limitation, rivets, pins, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 is an illustrative schematic diagram of a portion of an electrical switching apparatus, such as a circuit break, incorporating a strain relief assembly 100 in accordance with an exemplary, non-limiting embodiment of the disclosed concept.

In the example of FIG. 1, strain relief assembly 100 includes an accessory (e.g., without limitation, trip actuator 102) having a number of electrical conductors (e.g., without limitation, wires 112). Electrical switching apparatus, such as a circuit breaker including strain relief assembly 100, are subject to certain industry safety codes and regulations including, but not limited to, UL codes and International Electrotechnical Commission ("IEC") codes. One such standard from these codes corresponds to strain relief standards for wires exiting a circuit breaker. To test compliance with this standard, a wire is decoupled from an accessory within a circuit breaker, and a weight is applied to an end of the wire exiting the circuit breaker. The wire must be retained by the circuit breaker assembly when disconnected from the accessory while the weight is applying a force to the wire in an attempt to pull the wire out of the assembly. For example, the wires are disconnected from the accessory while a 20 lbs weight is applied to the wire, and when this occurs, the wire should not be pulled out from the circuit breaker. This may ensure that sudden or unexpected decoupling of the wire (or wires) from the circuit breaker will not injure or harm individuals proximate to the circuit breaker.

FIG. 1 illustrates one non-limiting example of a strain relief assembly 100 for addressing the foregoing issues and ensuring industry strain relief requirements are satisfied. In the example of FIG. 1, the accessory (e.g., without limitation, trip actuator 102), includes a cover 104 and a base 106. Cover 104 and base 106 are, for example, formed of a heat-resistant, non-conductive plastic, however any non-conductive material may be used. Located on top of cover 104, in the illustrative embodiment, is an auxiliary switch 110, which may be coupled (e.g., without limitation, riveted) to trip actuator 102. At one end of auxiliary switch 110 are one or more terminals 108. Terminal(s) 108 are conductive pieces with which one or more wires 112 electrically connect to auxiliary switch 110. When wires 112 are decoupled from terminals 108, for example in a testing scenario, strain relief assembly 100 is configured such that wires 112 do not get pulled out of the circuit breaker, thereby eliminating a potentially hazardous situation. Additional wires 122 are also included within strain relief assembly 100. Wires 122, in one exemplary embodiment, are connected to trip actuator 102 at a first end, and at a second end are connected to a printed circuit board ("PCB") or other interface or circuitry connected to a customer's component interface or third party circuitry.

Figure 2:
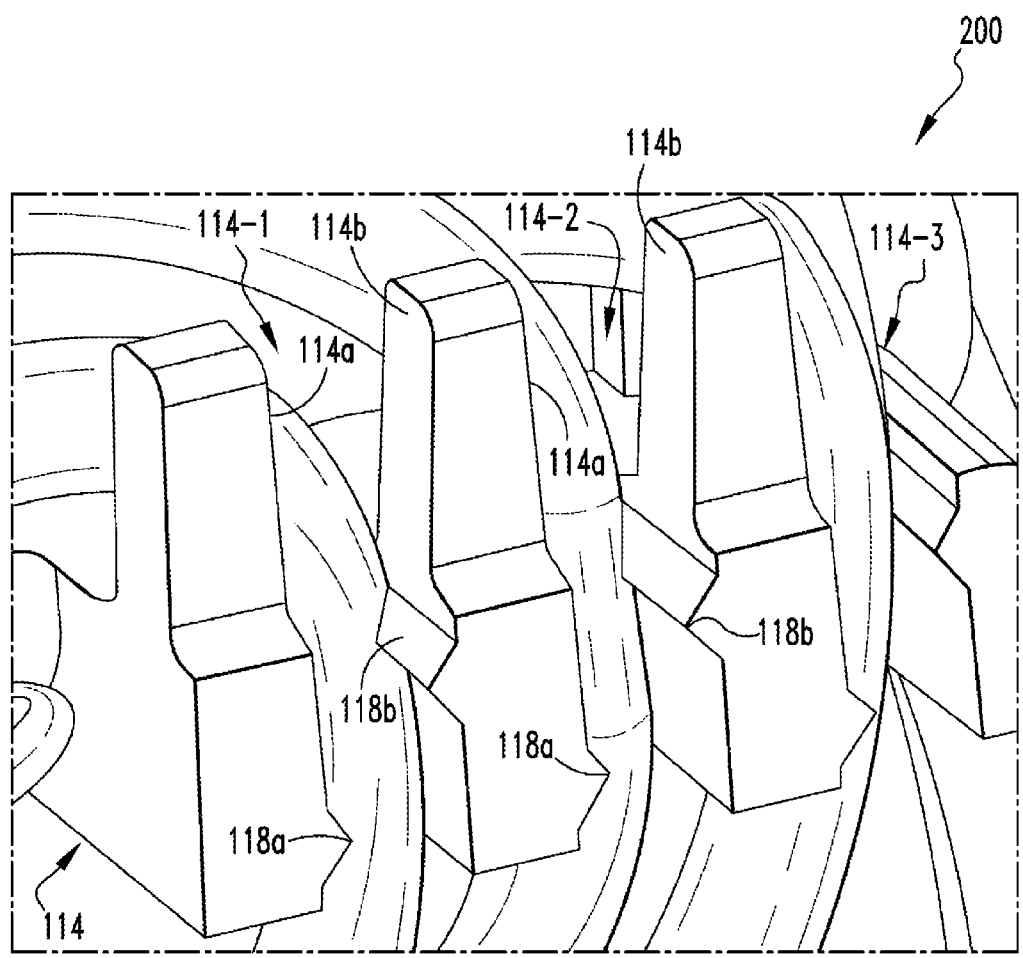
FIG. 2 is an illustrative schematic diagram of an enlarged portion of the circuit breaker and strain relief assembly therefor of FIG. 1.

In one exemplary embodiment, wires 112 are retained using a first set of grooves 114 located in cover 104 and a second set of grooves 116 located in base 106. First set of grooves 114, for example, may be formed in an extension 200 created on a side of cover 104 such that wires 112 wrap outwards, away from trip actuator 102. Extension 200, described in greater detail below with regards to FIG. 2, is formed of a substantially similar material as cover 104. For example, cover 104 may be integrally formed of a non-insulating material, such as a plastic, and extension 200 may be molded into, or with, cover 104. However, persons of ordinary skill in the art will recognize that, in some embodiments, extension 200 may be a separate component or piece coupled to cover 104.

In one exemplary embodiment, grooves 114 and grooves 116 may be misaligned with one another such that wires 112, when place within one or more of grooves 114-1, 114-2, 114-3, 116-1, 116, 2, and 116-3, are directed in different direction. For example, when a wire 112 is received within groove 114-1 of first set of grooves 114 of cover 104, wire 112 may be directed in a first direction (e.g., right, left, etc.). After exiting groove 114-1, wire 112 may then be received by groove 116-1, which directs wire 112 in a second direction, which is different than the first direction. This enables grooves 114-1 and 116-1 to create two "pinch" points, or redirects, which serve as retention mechanisms for wire 112. Thus, grooves 114-1 and 116-1, and similarly grooves 114-2, 114-3, 116-2, and 116-3, are operable to exert an opposing force, or opposing forces, to wire(s) 112 while within a corresponding groove of first set of grooves 114 and second set of grooves 116, which in turn counters the weight of wires 112, securing wires 112 as desired with respect to the strain relief assembly 100.

Persons of ordinary skill in the art will also recognize that any suitable alternative number of grooves or sets of grooves may be employed without departing from the scope of the disclosed concept. For example, and without limitation, a third set of grooves may be located between first set of grooves 114 and second set of grooves 116. The third set of grooves may redirect one or more wires 112 in another direction to further secure wire(s) 112 within strain relief assembly 100. As another example, a third and fourth set of grooves may be used, each of which may redirect wires 112 in different directions. Accordingly, persons of ordinary skill in the art will recognize that the number of grooves and the locations of those grooves is merely exemplary, and the aforementioned is merely one illustrative example.

In one exemplary embodiment, each groove 114-1, 114-2, 114-3 within first set of grooves 114 may include one or more teeth 118a, 118b, and each groove 116-1, 116-2, 116-3 within second set of grooves 116 may include one or more teeth 120a, 120b. Teeth 118a, 118b, 120a, 120b are each capable of providing an additional amount of force to wires 112 when wires 112 are placed within that teeth's respective groove. As described in greater detail below, teeth 118a, 118b, 120a, and 120b may be designed in various shapes and sizes, and the number of teeth located within a particular groove may vary. Furthermore, an amount of teeth 118a, 118b located within a groove of first set of grooves 114, and an amount of teeth 120a, 120b located within a groove of second set of grooves 116 need not be equal. For example, first set of grooves 114 may include two sets of teeth 118a, 118b (e.g., two teeth 118a and two teeth 118b), while second set of grooves 116 may include only one set of teeth 120a, 120b (e.g., one tooth 120a and one tooth 120b). Still further, a shape or size of each tooth within each groove need not be equal or the same. For example, teeth 118a, 118b may be triangular in shape, whereas teeth 120a, 120b may be rounded or flat in shape. Similarly, within a single groove (e.g., groove 114-1), the shape, size, and number of teeth may also vary. For example, within groove 114-1 of first set of grooves 114, two instances of teeth 118a and only one instance of teeth 118b may be included. As another example, some of teeth 118a, 118b may be triangular, while others may be rounded or flat protrusions. As yet another example, some of teeth 118a, 118b may be larger than other teeth or protrusions 118a, 118b.

FIG. 2 is an illustrative diagram of an enlarged portion of strain relief assembly 100 within a circuit breaker assembly of FIG. 1. Extension 200, as mentioned previously, corresponds to an extension or attachment for cover 104 that extends outwards, away from trip actuator 102, and includes first set of grooves 114 for retaining wires 112. In one exemplary embodiment, base 106 also includes a substantially similar extension as that of extension 200 of cover 104, with the exception that second set of grooves 116 would be included therein. Persons of ordinary skill in the art will further recognize that additional and/or different instances of extension 200, including additional sets of grooves, may also be included, without departing from the scope of the disclosed concept.

In the non-limiting, exemplary embodiment of FIG. 2, first set of grooves 114 includes three grooves 114-1, 114-2, and 114-3, located in parallel to one another. Each of grooves 114-1, 114-2, and 114-3 therefore is operable to receive a wire 112 therein, however more than one wire is also, in some embodiments, capable of being routed there through. Each of grooves 114-1, 114-2, and 114-3 includes a first surface 114a and a second surface 114b, which are substantially planar and located opposite one another such that first surface 114a faces second surface 114b. First surface 114a and second surface 114b are configured, in the exemplary embodiment, to be separated by a distance substantially equal to or greater than a thickness of wire 112, such that wire 112 is capable of being received within groove 114-1, 114-2, 114-3. For example, wire 112 may be approximately 0.125 inches thick (e.g., ⅛"), and therefore a separation distance of first surface 114a and second surface 114b of groove 114 may be slightly greater than the thickness of wire 112 (e.g., approximately 0.130 inches or more). Persons of ordinary skill in the art will further recognize that although first surface 114a and second surface 114b are shown as being substantially planar, in another embodiment, surfaces 114a, 114b may be angles, curved, beveled, or configured in any other suitable manner such that wires 112 are secured therein. For example, surfaces 114a and 114b may be tapered such that an upper portion of both surfaces 114a and 114b are separated by a first distance and a bottom portion of both surfaces 114a and 114b are separated by a second distance, where the first distance is greater than the second distance.

In the exemplary, non-limiting embodiment of FIG. 2, each surface 114a and 114b of grooves 114-1, 114-2, and 114-3 includes one or more teeth or protrusions 118a, 118b. In particular, located on surface 114a, for example, may be one or more teeth 118a, while one or more teeth 118b may be located on surface 114b. As described above, teeth 118a, 118b may be substantially similar in shape, size, and number, or they may each differ from one another. Furthermore, each groove 114-1, 114-2, 114-3 within first set of grooves 114 may include a different number, or configuration, of teeth 118a, 118b. For example, groove 114-1 may include two sets of teeth 118a, 118b (e.g., two instances of tooth 118a and two instances of tooth 118b), while groove 114-2 may include one set of 118a, 118b (e.g., one instance of tooth 118a and one instance of tooth 118b).

Tooth 118a, located on first surface 114a, is operable to apply a force against wire 112 in the direction of second surface 114b. Tooth 118b, on the other hand, located on second surface 114b, is operable to apply a substantially similar force in magnitude against wire 112 in the direction of first surface 114a. In this manner, teeth 118a, 118b serve to apply alternating pressure points against wire 112 within groove 114-1, 114-2, 114-3. The alternating pressure point pattern acts as a securing mechanism for retaining wires 112 with respect to strain relief assembly 100, as desired. Taken in conjunction with the redirection of wires 112 from first set of grooves 114 to second set of grooves 116 (or to any other additional or different sets of grooves), a substantially secure assembly is formed for retaining wires 112 such that wires 112 remain in place when disconnected from terminal 108 and a weight is applied to wires 112 in an attempt to remove wires 112. Thus, each groove 114-1, 114-2, 114-3, and 116-1, 116-2, 116-3, and each tooth 118a, 118b, 120a, 120b function as resistive members securing or stabilizing wires 112 in place, thereby reducing the likelihood that wires 112 would be pulled out of the circuit breaker causing harm to nearby individuals or equipment.

In one exemplary embodiment, extension 200 may include an additional surface or additional surfaces, which may also include one or more instances of teeth 118a, 118b. For example, a third surface may be located on extension 200 which may serve to apply an additional force against wires 112 in the direction of trip actuator 102 or in a direction away from trip actuator 102.

In another exemplary embodiment, extension 200 may include one or more openings or apertures with which wires 112 may be routed through. For example, an opening between surfaces 114a and 114b may be employed to assist in securing wire 112. The openings may further include one or more teeth or protrusions that also serve to provide resistance against an exterior cover of wires 112 to assist in securing wires 112 in place.

Figure 3A:
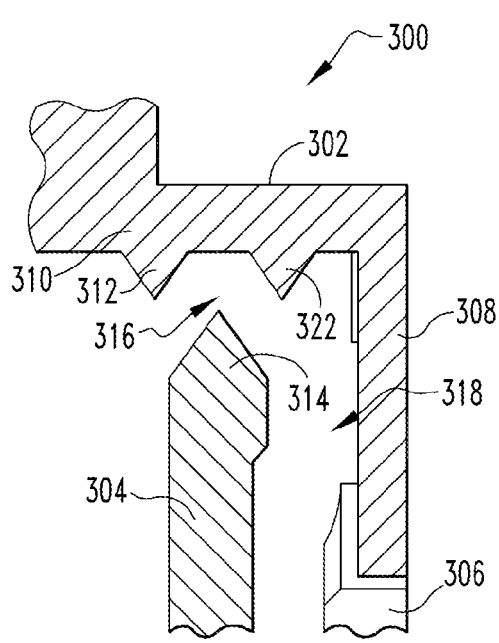
FIGS. 3A-3C are illustrative schematic diagrams of section views of a portion of a strain relief assembly in accordance with another embodiment of the disclosed concept.
Figure 3B:
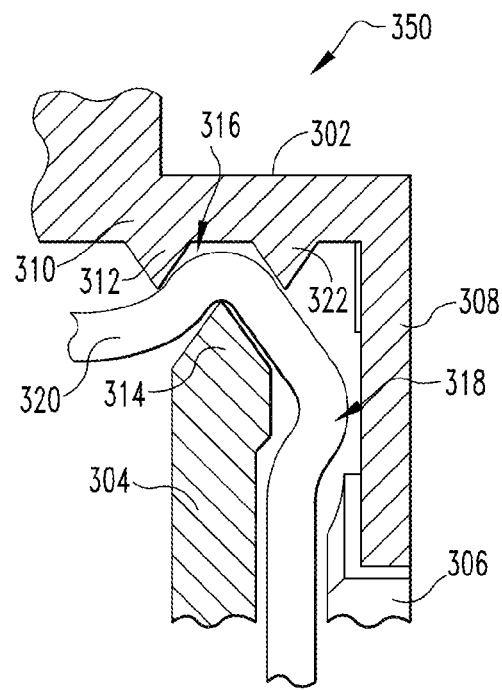
Figure 3C:
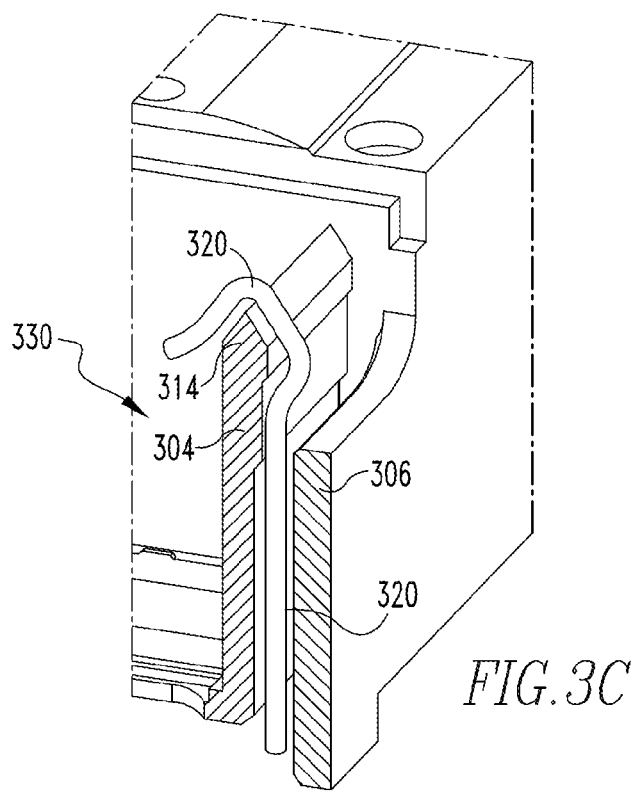

FIGS. 3A-3C are illustrative schematic diagrams of side views of a portion of another circuit breaker assembly in accordance with various embodiments. Assembly 300, in one non-limiting, exemplary embodiment, includes portions of a primary cover 330, as seen in FIG. 3C, and a secondary cover 302. Wires, such as wires 112 of FIGS. 1 and 2, or a wire 320 of FIGS. 3B and 3C, connect to an accessory within a pocket of primary cover 330 at one end, and may be routed out of the circuit breaker at the other end. For purely illustrative purposes, in the exemplary non-limiting embodiment of FIG. 3A, wire 320 is not included, whereas in FIGS. 3B and 3C, wire 320 is included. When a wire (e.g., wire 320) is disconnected from its respective accessory, that wires should substantially remain in place within assembly 300 such that the wire does not accidently get pulled out of assembly 300, thereby creating a hazardous situation for equipment and/or individuals located within the area of assembly 300.

Primary cover 330 may include an extension portion 304 and a side wall 306. Located on an interior side of extension portion 304, in one embodiment, is the pocket where one or more accessories are located. Secondary cover 302, in the exemplary embodiment, includes an upper portion 310, which extends across a top of primary cover 330, and side portion(s) 308, located on either side of upper portion 310. A trough 318 is, in the exemplary embodiment, created between extension portion 304, and side portion 308 of secondary cover 302 and side wall 306 of primary cover 330. Trough 318 enables a wire, such as wire 320, to exit out of assembly 300, 350 such that it can couple to one or more customer interface devices.

Trough 318 is also, at one end, in communication with a channel 316 formed between an end 314 of extension portion 304 of primary cover 330 and a first protrusion 312 and a second protrusion 322 of top portion 310 of secondary cover 302. Wire(s) 320, therefore, connect at one end to an accessory device located within a pocket formed by primary cover 330, and extend through channel 316 to trough 318, and then out of the circuit breaker. In the exemplary embodiment, trough 318 and channel 316 are in fluid communication with one another such that a substantially uniform passageway for wire 320 is created between primary cover 330 and secondary cover 302.

In one exemplary embodiment, wire 320 is approximately 0.125 inches (e.g., 1/8") thick. However, other diameters for wire 320 may be used. For example, wires having a width or diameter of at least 0.120 inches may be used. Thus, channel 316 and trough 318 are formed such that they are substantially large enough to accommodate wire 320. Therefore, in one exemplary the width or clearance of channel 316 and trough 318 is greater than 0.125 inches, such as approximately 0.130 inches. However, both channel 316 and trough 318 may have any suitable thickness. In another exemplary embodiments, each of channel 316 and 318 have a different, or a varying, thickness. For example, channel 316 may have a substantially constant thickness of 0.140 inches, while trough 318 may have a substantially constant thickness of approximately 0.160 inches. As another example, trough 318 may have a slightly tapering width such that at a first end, proximate to channel 316, trough 318 has a width of approximately 0.150 inches, while closer to an exit from the circuit breaker, opposite the first end, may have a width of approximately 0.130 inches. Persons of ordinary skill in the art will recognize that the aforementioned widths or dimensions for channel 316 and 318 are merely exemplary, and any suitable width may be used so long as wires 320 are able to be routed there through.

As seen in FIG. 3A, assembly 300 includes three pressure points where force is applied to wire 320 (shown in assembly 350 of FIG. 3B). Extension portion 304 of primary cover 330 includes end 314, which in the illustrated embodiment is triangular shaped, or pointed. End 314 serves to apply a force against wire 320 in a direction toward top portion 310 of secondary cover 302. Application of this force by end 314 of extension portion 304 creates a resistance between the surface of wire 320 and end 314, inhibiting motion of wire 320. Wire 320 is further inhibited from moving by application of an additional force, or additional forces, from protrusions 312 and 322. Each of protrusions 312 and 322 extend outward from top portion 310 of secondary cover 302 in a direction towards extension portion 304 of primary cover 330. The force applied by each of protrusions 312 and 322 press into portions of wire 320, which pushes wire 320 into end 314 of extension 304, further inhibiting movement of wire 320. This further enhances the stability of wire 320 by creating additional resistance between wire 320 and end 314, and protrusions 312 and 322. Therefore, if wire 320 is disconnected from an accessory device of the circuit breaker, and a weight is applied at an external end of wire 320, wire 320 will be secured in place such that it does not exit the circuit breaker, creating a potentially hazardous condition.

In the illustrative, non-limiting embodiment of FIGS. 3A and 3B, first protrusion 312 is located on one side of end 314 (e.g., to the left of the center or tip of triangular shaped end 314), and second protrusion 322 is located on an opposite side of end 314 (e.g., to the right of the center or tip of triangular shaped end 314), such that end 314 is located substantially midway between first and second protrusions 312 and 322, respectively. This enables each of end 314, first protrusion 312, and second protrusion 314 to create a substantially symmetric application of force to wire 320 at three different points along the length of wire 320. Persons of ordinary skill in the art will recognize that any configuration of end 314, and protrusions 312 and 322 may be used, and the aforementioned are merely exemplary. For example, only one protrusion 322 for secondary cover 302 may be used in conjunction with end 314, however more protrusions or abutments may also be used.

Additionally, in the illustrated, non-limiting, embodiment, end 314 and protrusions 312 and 322 are pointed, or triangular, in shape. By being pointed or triangular in shape, a tip of each of protrusions 312 and 322 and end 314 is able to impinge upon a different point along the length of wire 320 (e.g., in a first, second, and third location). However, alternative geometric configurations may be used. For example, each of end 314, and protrusions 312 and 322 may be rounded or curved, or each may be square or rectangular. In one embodiment, one or more of end 314 and protrusions 312, 322 are triangular or pointed, while others are rounded or rectangular. Persons of ordinary skill in the art will also recognize that any combination of configurations may be used, and the aforementioned are merely exemplary.

Still further, although only two protrusions 312 and 322, and one end 314 for extension portion 304, are shown within assemblies 300 and 350, more or fewer impingement or pressure points may be used. For example, extension portion 304 may include a second end, which may be substantially similar to end 314, with the exception that it may be located within trough 318, extending outward from extension portion 304 towards side portion 308 of secondary cover 302. This second end would, therefore, apply a force to wire 320 in a direction towards side portion 308 of secondary cover 302. To that effect, in an alternative embodiment, side portion 308 may include one or more additional protrusions, which may be shaped in a substantially similar format as protrusions 312 and 322. For example, one or more additional protrusions may be included adjacent side portion 308 of secondary cover 302, which extend outward from side portion 308 in a direction towards extension portion 304 of primary cover 330. These additional protrusions would serve to push or force wire 320 into the second end (e.g., similar to how protrusions 312, 322 "force" or push wire 320 into end 314), thereby increasing the resistance between wire 320 and primary and secondary covers 330 and 302. These additional protrusions may therefore, increase the ability to inhibit motion or movement of wire 320 within assemblies 300 and 350, particular if wires 320 are disconnected from the circuit breaker at one end, and a weight is applied to wires 320 at an opposite end, in an attempt to pull wires 320 from the circuit breaker.

In an exemplary embodiment, parts or sections of end 314 and/or protrusions 312, 322 are capable of including one or more additional resistive features. As described in greater detail below with regards to FIGS. 6A-6C, each of end 314 and protrusions 312 and 322 may have a jagged, ridged, ribbed, wavy, bumpy, or rough surface. By having a non-smooth surface, end 314 and/or protrusions 312 and 322 will have an increased coefficient of friction arising between itself and a contacting portion of wire 320. Furthermore, in another exemplary embodiment, a part or section of end 314 and/or protrusions 312, 322 may include a section of adhesive, or a sticky surface, which causes greater retention between that surface and a surface of wire 320.

Figure 4:
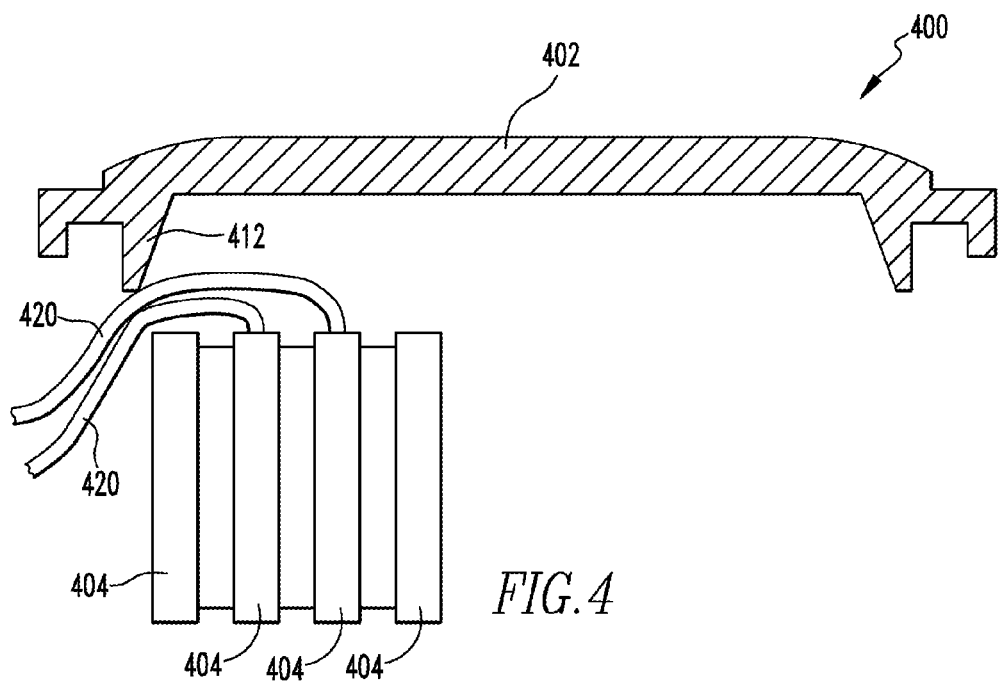
FIG. 4 is an illustrative schematic diagram of a strain relief assembly for assisting in securing a number of wires coupled to an accessory, in accordance with another embodiment of the disclosed concept.

FIG. 4 is an illustrative schematic diagram of a strain relief assembly 400 in accordance with another non-limiting embodiment of the disclosed concept. In the example of FIG. 4, the electrical switching apparatus includes a secondary cover 402, which resides on top of one or more auxiliary switches 404. Extending out of auxiliary switches 404 are wires 420, which connect to, and communicate with, external circuitry (e.g., printed circuit boards, customer interface boards, bell alarms, arc fault switches, trip actuators, etc.).

To ensure that wires 420 remain secured by strain relief assembly 400 in the situation where wires 420 become disconnected from auxiliary switches 404 and a weight or force is applied to an end of wire 420 exiting strain relief assembly 400, secondary cover 402 includes, in one embodiment, ledge 412. Ledge 412 is located at an end of secondary cover 402 along an inner portion of secondary cover 402. In particular, ledge 412 extends downwards, towards auxiliary switches 404. When secondary cover 402 is placed on top of auxiliary switches 404, which may be located within a pocket of a primary cover, such as primary cover 330 of FIG. 3C, ledge 412 will apply a force against wires 420 in a downwards direction towards auxiliary switches 404. The application of the downward force by ledge 412 of secondary cover 402 serves to impinge wires 420 within strain relief assembly 400, thereby inhibiting the ability of wires 420 from being pulled out of strain relief assembly 400 if disconnected from auxiliary switches 404.

In one embodiment, secondary cover 402 may include multiple instances of ledge 412. For example, two instances of ledge 412 located on both sides of cover 402 may be included. The additional ledge 412 is operable to serve as an additional retention mechanism for securing wires 420 in place when secondary cover 402 is placed on top of auxiliary switches 404. In yet another embodiment, one or more modifications to a surface of ledge 412, as described in greater detail below with regards to FIGS. 6A-6C, may be used to increase the coefficient of friction or resistive force between the surface of ledge 412 and an exterior surface of wires 420.

Figure 5A:
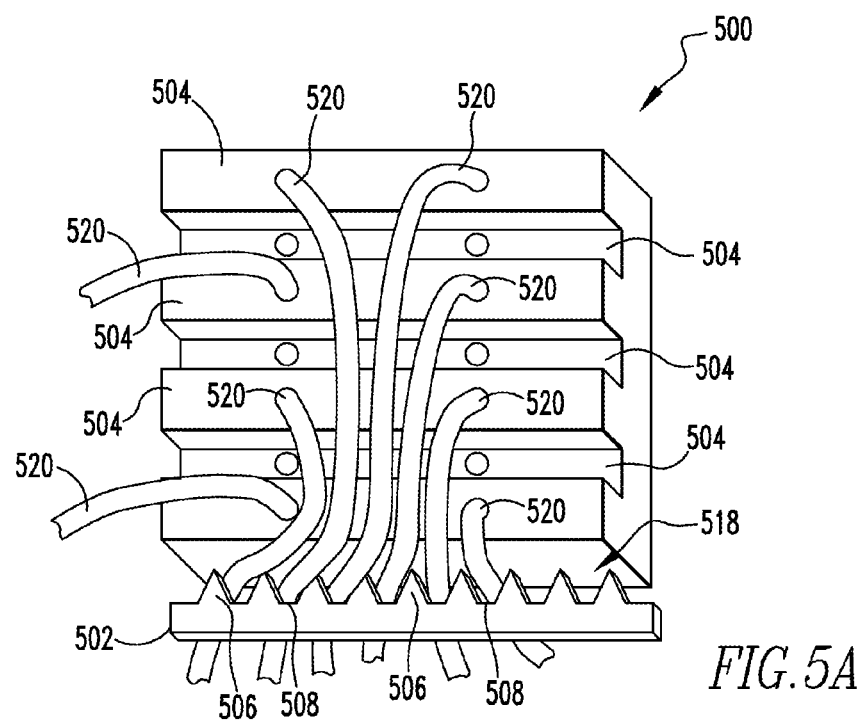
FIGS. 5A and 5B are illustrative schematic diagrams of a shim for securing a number of wires coupled to an accessory, in accordance with another embodiment of the disclosed concept.
Figure 5B:
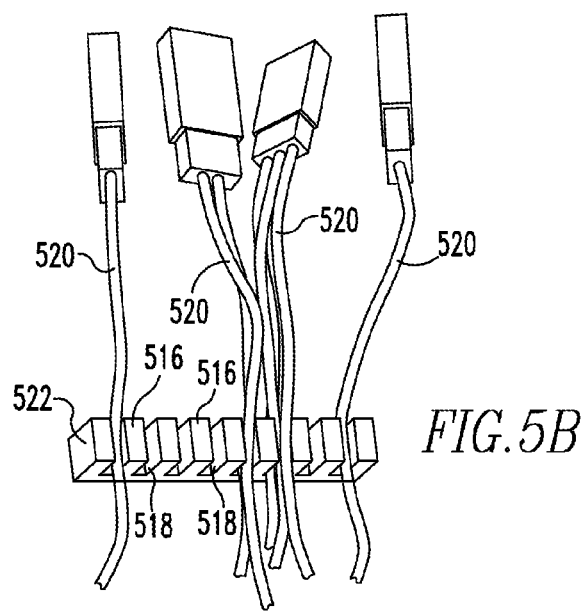

FIGS. 5A and 5B are illustrative schematic diagrams of a rubber shim used for a securing one or more wires coupled to auxiliary switches in accordance with various embodiments. Strain relief assembly 500 of FIG. 5A, in one exemplary, non-limiting embodiment, includes auxiliary switches 504, which have one or more wires 520 attached thereto. As mentioned previously, wires 520 couple at one end to auxiliary switches 504, and at another end, wires 520 exit a circuit breaker to couple/connect with various consumer electronic interfaces (e.g., printed circuit boards, etc.). Strain relief assembly 500 of FIG. 5A includes four (4) instances of auxiliary switches 504, however persons of ordinary skill in the art will recognize that a greater or smaller number of auxiliary switches 504 may be used, and the aforementioned is merely exemplary. Furthermore, in one embodiment, auxiliary switches 504 of FIG. 5A are substantially similar to auxiliary switches 404 of FIG. 4, and the previous description applies.

Strain relief assembly 500, in one exemplary embodiment, also includes shim 502. Shim 502 is a toothed structure that serves to help retain wires 520 in place within strain relief assembly 500 such that, if wires 520 are decoupled from auxiliary switches 504, wires 520 will remain within strain relief assembly 500 when a weight or force is applied to an opposite end of wire 520 in an attempt to pull wires 520 out of strain relief assembly 500 (e.g., the circuit breaker). Shim 502 includes multiple "teeth" or protrusions 506, separated from one another by grommets 508. Teeth 506 are arranged along shim 502 such that they are placed side by side along a horizontal length of shim 502. In one embodiment, teeth 506 are triangular in shape, however other configurations are possible including, but not limited to, curved, rectangular, or any other shape, or any combination of shapes. For example, shim 522 of FIG. 5B includes rectangular teeth 516 and grommets 518, which are arranged along a horizontal width of shim 522. In one embodiment, shim 522 of FIG. 5B is substantially similar to shim 502 of FIG. 5A, with the exception that the former includes rectangular shaped teeth 516 as opposed to triangular shaped teeth 506 of shim 502. A distance between one tooth and an adjacent tooth is, in an exemplary embodiment, substantially large enough such that wire(s) 520 can be inserted within grommet 508 located there between. For example, the distance between a tip of triangular shaped tooth 506 and a tip of an adjacent or neighbor tooth 506 may be approximately 0.125 inches, corresponding to an instance of wire 520 having a diameter of approximately 0.125 inches. However, persons of ordinary skill in the art will recognize that any separation distance may be used between each tooth 506 of shim 502, and likewise for each grommet 508 of shim 502, and the aforementioned is merely exemplary.

Wires 520 are operable to extend out of auxiliary switch 504 and be tucked into a gap 518 formed between a side surface of an auxiliary switch 504 and shim 502. When wires 502 are placed within gap 518, shim 502 is arranged such that one wire 520, or more than one wire 520, is received between two teeth 506 and resides or substantially contacts a grommet 508 located between those two teeth 506. This "combed" design enables shim 502 (and shim 522) to create a resistive force between the surface of teeth 506, grommets 508, and an outer surface of wires 520. The resistive force serves to inhibit wires 520 from moving within strain relief assembly 500, particularly in the scenario where additional force is applied to an end of wires 520 exiting strain relief assembly 500, in an attempt to try and remove wires 520. In one exemplary embodiment, shim 502 may be placed on a portion of a primary cover (e.g., primary cover 330), or a secondary cover (e.g., side portion 308 of secondary cover 302), to further secure wires 520 in place. Shim 502, therefore, will serve to apply a force against wires 520 in a direction towards auxiliary switches 504.

In one exemplary embodiment, shim 502 is formed from a non-conductive material, such as a plastic or rubber. In another exemplary embodiment, shim 502 may be integrally formed with a portion of secondary cover 302 of FIG. 3A or primary cover 330. Furthermore, multiple instances of shim 502 may be employed within strain relief assembly 500, and each instance of shim 502 may be located at a different location. For example, two instances of shim 502 may be used within strain relief assembly 300 of FIG. 3A. In this particular scenario, a first shim 502 may be located towards an upper portion of side portion 308 of secondary cover 302, while a second shim 502 may be located towards a lower portion of side wall 306 of primary cover 306. This implementation is capable of applying additional pressure points along wire 320, 520 to secure it in place, thereby inhibiting motion of wire 320, 520 if a weight or force is applied to an end of wire 320, 520 in an attempt to try and remove the wire from the assembly.

Figure 6A:
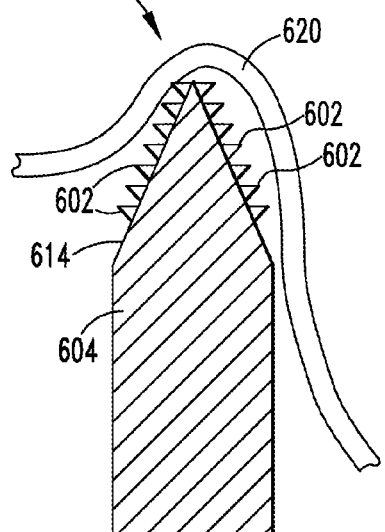
FIGS. 6A-6C are illustrative schematic diagrams of strain relief assemblies in accordance with additional non-limiting example embodiments of the disclosed concept.
Figure 6B:
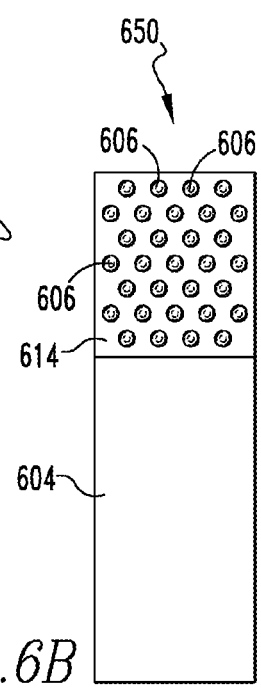
Figure 6C:
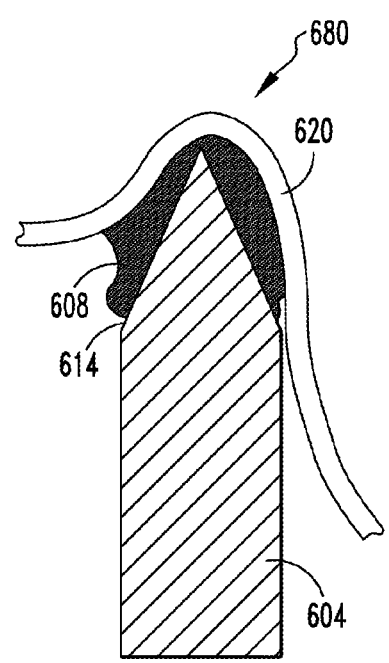

FIGS. 6A-6C are illustrative diagrams of various configurations of protrusions for assisting in securing wires coupled to accessories within a circuit breaker in accordance with various embodiments. Configuration 600 of FIG. 6A describes one exemplary embodiment for using additional spiked projections located along an exterior surface of a protrusions, such as protrusion 614 located on an extension 604. Configuration 600, for example, is a side view of protrusion 614 and extension portion 604. In one exemplary embodiment, protrusion 614 and extension portion 604 are substantially similar to end 314 (e.g., a triangular shaped protrusion) and extension portion 304 of strain relief assembly 300, and the aforementioned description is applicable.

In this illustrative embodiment, protrusion 614 is substantially triangular or pointed in shape. Located along each side of protrusion 614 are multiple instances of spiked projections 602, which extend outwards from protrusion 614 in a direction of a normal axis from protrusion 614. In other words, each spike 602 is oriented such that it is perpendicular to the surface of protrusion 614. Any number of spikes 602 may be included along the surface of protrusion 614, and in one embodiment, the number of spikes may differ between the two surfaces of triangular shaped protrusion 614, or the number of spikes 602 may vary along a width of each surface of triangular shaped protrusion 614.

When wire 620 is placed over protrusion 614, the pointed tip of protrusion 614 applies a force against wire 620, serving as a point of impingement. To increase the resistance between wire 620 and protrusion 614, spikes 602 can be employed. Each spike 602, which is triangular in shape, has a pointed tip that applies an additional or separate force against wire 620, which also serves as additional points of impingement. The various points of spikes 602 increase the resistance between the exterior cover of wire 620 and protrusion 614, thereby increasing security of wire 620 within a corresponding circuit breaker. In particular, when a force is applied to an end of wire 620 in an attempt to extricate wire 620 from the circuit breaker, spikes 602 serve as additional securing mechanisms to hold wire 620 in place, thereby inhibiting motion and preventing wire 620 from being pulled out of the circuit breaker.

Persons of ordinary skill in the art will recognize that although spikes 602, as shown within FIG. 6A, are triangular or pointed in shape, any shape may be used instead of, or in addition to, the triangular or pointed arrangement. Such arrangements include, but are not limited to, rounded projections, rectangular projections, wavy projections, ribs, or any other type of projection, or any combination thereof. For example, configuration 650 of FIG. 6B describes another exemplary embodiment for using additional projections located along an exterior surface of a protrusions, such as protrusion 614 located on an extension 604. Configuration 650, in the illustrative embodiment, includes a matrix of rounded bumps or projections 606 located on protrusion 614 of extension portion 604. Bumps 606 correspond to small dimples or detents that serve to interfere with wire 620 when wire 620 is places on top of protrusion 614 of extension portion 604. Bumps 606 function in a substantially similar manner as spikes 602 of FIG. 6A, and the previous description may apply. In one embodiment, a combination of spikes 602 and bumps 606 are placed on a surface of protrusion 614, serving to provide varying resistance patterns between wire 620 and the surface of protrusion 614.

Configuration 680 of FIG. 6C is one exemplary, non-limiting embodiment, including wire 620, which is placed on top of protrusion 614 of extension portion 604. Located between wire 620 and a surface of protrusion 614, in one embodiment, is material 608. Material 608 serves to fill in any gaps which may exist between wire 620 and protrusion 614, thereby creating a tighter fit for wire 620 within a channel, such as channel 316, formed between extension portion 604 of the primary cover and a secondary cover, such as secondary cover 302.

Material 608, in one embodiment, is a heat shrink material that is injectable into the assembly once wire 620 is in place. Material 608, in another embodiment, is an epoxy or adhesive materials, which couples to the surface of protrusion 614 as well as an exterior surface of wire 620. In both scenarios, the frictional force between wire 620 and protrusion 614 is increased due to material 608, thereby securing wire 620 in place and inhibiting motion such that unintentional removal of wire 620 from the circuit breaker is minimized or negated.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A strain relief assembly for an electrical switching apparatus, comprising:
 a cover comprising:
  at least one first groove structured to receive at least one wire, the at least one first groove having a first side and a second side located opposite the first side; and
  at least one first protrusion located on at least one of the first side and the second side, each at least one first protrusion extending outwardly from the corresponding one of the first side and the second side toward the other of the first side and the second side to apply a force against the at least one wire, thereby pinching and securing the at least one wire in at least one first location within the at least one first groove; and
 a base comprising:
  at least one second groove structured to receive the at least one wire, respectively, from the at least one first groove, the at least one second groove having a third side and a fourth side located opposite the third side; and
  at least one second protrusion located on at least one of the third side and the fourth side, each at least one second protrusion extending outwardly from the corresponding one of the third side and the fourth side toward the other of the third side and the fourth side to apply a force against the at least one wire, thereby pinching and securing the at least one wire in at least one second location within the at least one second groove.

2. The strain relief assembly of claim 1, wherein the at least one first groove and the at least one second groove are misaligned such that the at least one wire is directed in a first direction when received by the at least one first groove, and then is redirected in a second direction when received by the at least one second groove, thereby creating a plurality of pinch points to retain the at least one wire while reducing strain on the at least one wire.

3. The strain relief assembly of claim 1, wherein:
 the at least one first protrusion comprises:
  a first abutment located on, and protruding out from, the first side; and
  a second abutment located on, and protruding out from, the second side; and the at least one second protrusion comprises:
a third abutment located on, and protruding out from, the third side; and
a fourth abutment located on, and protruding out from, the fourth side.

4. The strain relief assembly of claim 3, wherein:
the first abutment and the third abutment both protrude in a third direction;
the second abutment and the fourth abutment both protrude in a fourth direction; and
the third direction is opposite the fourth direction.

5. The strain relief assembly of claim 3, wherein the first abutment, second abutment, third abutment, and fourth abutment are each substantially triangular in shape such that they impinge the at least one wire when the at least one wire is received within the at least one first groove and the at least one second groove.

6. The strain relief assembly of claim 1, wherein:
the first side is substantially parallel to the second side;
the third side is substantially parallel the fourth side; and
a surface of the first side, second side, third side, and fourth side that contacts the at least one wire, is substantially coarse.

7. The strain relief assembly of claim 1, wherein:
the at least one wire comprises a first wire and a second wire;
the at least one first groove comprises a first groove structured to receive the first wire and a second groove structured to receive the second wire; and
the at least one second groove comprises a third groove structured to receive the first wire and a fourth groove structured to receive the second wire.

8. The strain relief assembly of claim 1, further comprising:
an accessory component comprising at least one third groove operable to receive the at least one wire from one of: the at least one first groove and the at least one second groove, wherein:
the at least one first groove directs the at least one wire in a first direction, the at least one second groove directs the at least one wire in a second direction, and the at least one third groove directs the at least one wire in a third direction.

9. The strain relief assembly of claim 1, wherein the cover and the base are formed, at least in part, of a non-insulating plastic.

10. The strain relief assembly of claim 1, wherein:
the at least one first groove of the cover is located on an extension from a top portion of the cover; and
the at least one second groove of the cover is location on an extension from a bottom portion of the base.

11. A strain relief system for an electrical switching apparatus, comprising:
a primary cover including a side wall and an extension portion that form a trough, the extension portion having a first protrusion located at an end of the extension portion;
a secondary cover placed over the primary cover, the secondary cover comprising at least a second protrusion and a third protrusion; and
a wire coupled to an accessory component located within a pocket of the primary cover, wherein the strain relief system is structured such that the wire:
extends through a channel formed between the first protrusion of the primary cover and the second protrusion and the third protrusion of the secondary cover; and
exits the electrical switching apparatus from the trough, which is connected to the channel,
wherein the first protrusion, second protrusion, and the third protrusion each are structured to impinge the wire at separate locations along a length of the wire.

12. The strain relief system of claim 11, wherein the channel and the trough have a width of at least approximately 0.120 inches.

13. The strain relief system of claim 11, wherein the first protrusion, second protrusion, and the third protrusion each have a surface that is substantially coarse.

14. The strain relief system of claim 11, wherein a section of a surface of at least one of the first protrusion, second protrusion, and the third protrusion comprises an adhesive.

15. The strain relief system of claim 11, wherein the first protrusion and the second protrusion impinge the wire in a first direction, the secondary cover further comprises:
a fourth protrusion that impinges the wire in a second direction perpendicular to the first direction.

16. The strain relief system of claim 11, wherein the second protrusion is separated from the third protrusion by a distance equal to approximately a width of the extension portion.

17. The strain relief system of claim 11, further comprising:
a grooved structure that is coupled to the secondary cover, wherein strain relief system is structured such that:
the wire extends through a groove of the grooved structure.

18. The strain relief system of claim 17, wherein:
the first protrusion is structured to apply a first force to the wire in a first direction at a first location along a length of the wire;
the second protrusion is structured to apply a second force to the wire in a second direction at a second location along the length of the wire, the second direction being opposite the first direction;
the third protrusion is structured to apply a third force to the wire in the second direction at a third location along the length of the wire; and
the groove is structured to apply a fourth force to the wire in a third direction that is perpendicular to the first direction and the second direction, the fourth force being applied at a fourth location along the length of the wire.

19. The strain relief system of claim 17, wherein the grooved structure comprises:
a plurality of grooves, each groove being structured to receive a different wire coupled to a different accessory unit.

* * * * *